United States Patent [19]

Stephan et al.

[11] Patent Number: 5,748,185

[45] Date of Patent: May 5, 1998

[54] TOUCHPAD WITH SCROLL AND PAN REGIONS

[75] Inventors: Allan H. Stephan, Seattle; Brent N. LaPorte, Bellevue; Stephen B. Powers, Seattle; Mark McNeely, Mercer Island, all of Wash.

[73] Assignee: Stratos Product Development Group, Seattle, Wash.

[21] Appl. No.: 674,837

[22] Filed: Jul. 3, 1996

[51] Int. Cl.$^6$ .............................. G09G 1/00; G09G 5/00
[52] U.S. Cl. .......................... 345/173; 345/157; 345/174
[58] Field of Search .................................... 345/174, 173, 345/157, 121, 127, 158, 123, 156, 175, 176, 177, 178; 395/155, 157, 159

[56] References Cited

U.S. PATENT DOCUMENTS

| | | | |
|---|---|---|---|
| 4,550,221 | 10/1985 | Mabusth | 345/173 |
| 4,821,029 | 4/1989 | Logan et al. | 345/173 |
| 4,831,556 | 5/1989 | Oono | 345/121 |
| 4,862,151 | 8/1989 | Grauz et al. | 345/173 |
| 4,988,982 | 1/1991 | Rayner et al. | 345/173 |
| 5,031,119 | 7/1991 | Dulaney et al. | 345/173 |
| 5,289,168 | 2/1994 | Freeman | 345/121 |
| 5,402,151 | 3/1995 | Duwaer | 345/174 |
| 5,414,413 | 5/1995 | Tamaru et al. | 345/173 |
| 5,469,194 | 11/1995 | Clark et al. | 345/173 |
| 5,485,174 | 1/1996 | Henshaw et al. | 345/127 |
| 5,528,259 | 6/1996 | Bates et al. | 345/121 |

*Primary Examiner*—Raymond J. Bayerl
*Assistant Examiner*—John Suraci
*Attorney, Agent, or Firm*—Christensen O'Connor Johnson & Kindness PLLC

[57] ABSTRACT

A touchpad (50) having multiple regions that may be linked to various commands or functions within a graphical user interface (GUI). Preferably, a cursor control region (54), a scroll control region (56), and a pan control region (58) are defined on the touchpad. Movement of a contact point in the cursor control region causes movement of a cursor in the GUI. Movement of a contact point in the scroll control region or the pan control region causes scrolling or panning, respectively, of the workspace in the GUI. The multiple regions may be mapped onto a single touchpad member (80) or each region identified with a separate touchpad member.

28 Claims, 10 Drawing Sheets

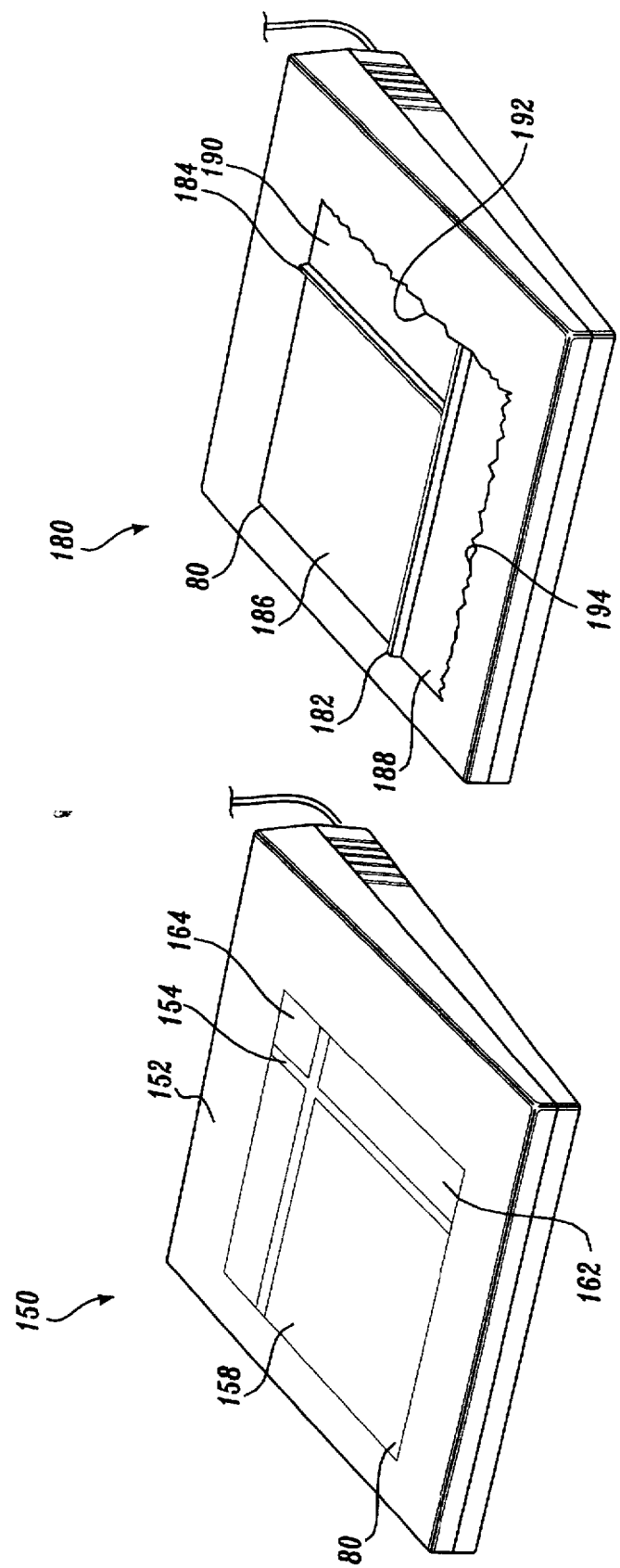

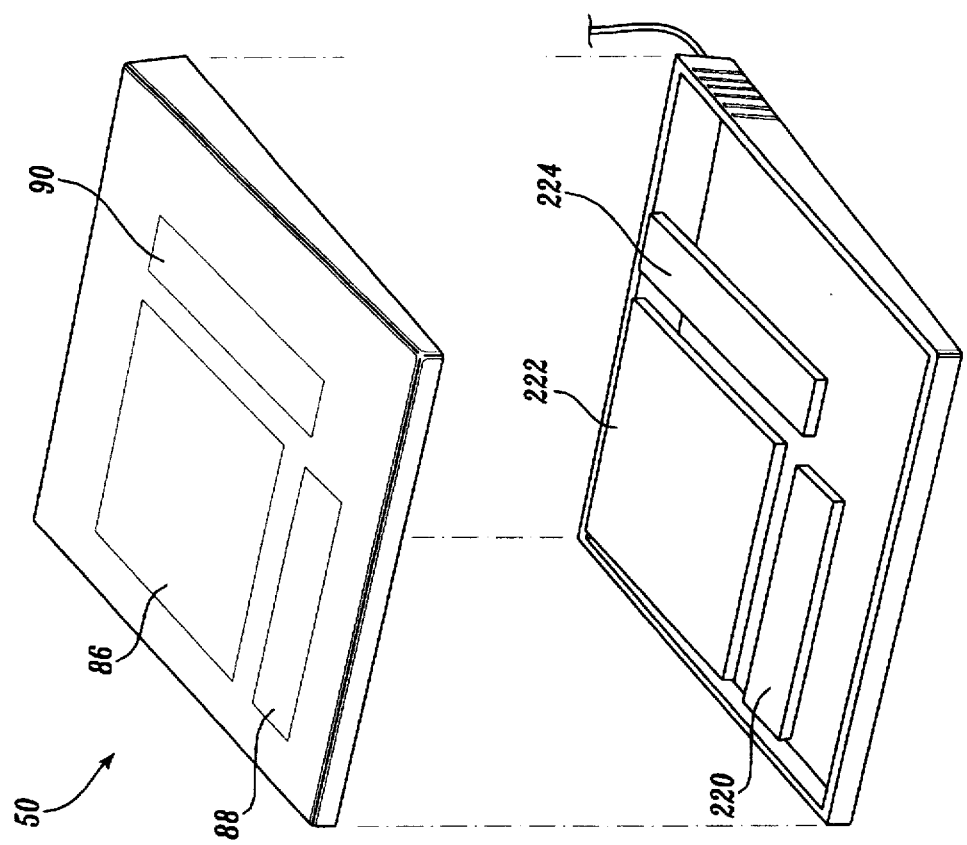
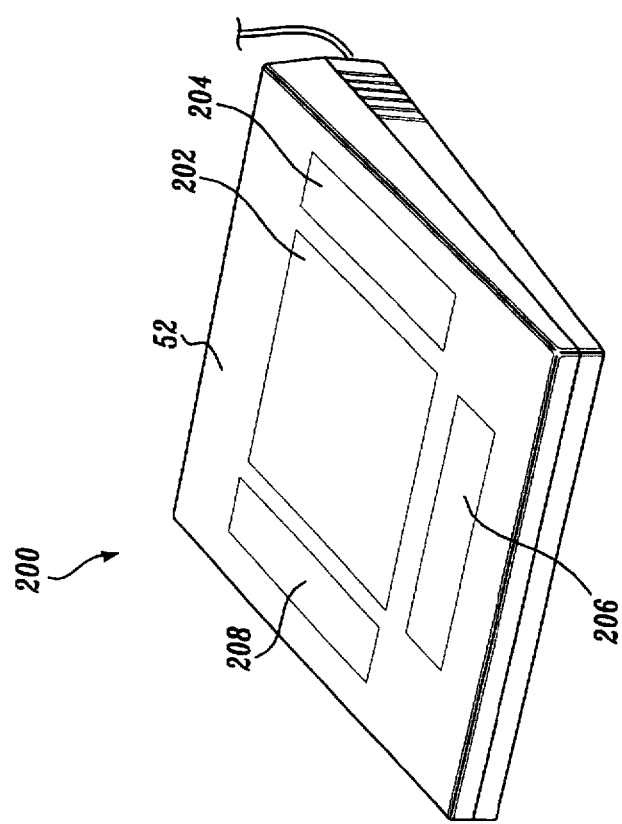

TOUCHPAD WITH SCROLL AND PAN REGIONS

FIELD OF THE INVENTION

The present invention relates generally to computer user input devices and, in particular, to computer touchpads or touch panels.

BACKGROUND OF THE INVENTION

Computers have always required user input devices to allow a user to move a cursor to various locations in a computer program display. Initially, computers with text based user interfaces required only arrow keys to allow cursor movement. The advent of graphical user interfaces (GUIs), however, dictated a more sophisticated user input device. Many types of user input devices have evolved to allow a user to efficiently operate within a GUI environment. The three most popular devices are mice, trackballs, and touchpads. Using a mouse, trackball, or touchpad, a user may manipulate a cursor to select different functions or commands in the GUI. When the cursor is positioned over a desired icon or menu item, buttons are typically provided on the input device to allow a user to implement the selected command or function.

A common characteristic of the three most popular types of computer user input devices is that the positional information from the user input devices is exclusively linked to a single function in the GUI, typically the cursor movement. For example, a mouse generates information corresponding to the relative X,Y movement of the mouse as the user moves the mouse. The movement information is interpreted by the computer and translated to produce movement of the on-screen cursor. Similarly, signals generated by a touchpad are converted to X,Y movement information to interface with the GUI. Touchpads generate a signal that corresponds to the location on the surface of the touchpad where the user contacts the touchpad. Firmware in the touchpad converts the absolute position as the user moves the contact point on the touchpad to relative X,Y movement information that is provided to the computer. A touchpad driver processes the relative X,Y movement information and interfaces with the computer operating system and the GUI. As the user moves their contact point with the touchpad, the cursor in the GUI therefore moves in a similar manner. In all cases, however, an X,Y movement signal from the user input device is mapped to a single function (e.g., cursor movement) in the GUI.

Because the user input device/GUI mapping is limited to controlling a single function, the interface between the user and a program operating within the GUI is oftentimes less than optimal. For example, FIG. 1 is a representative screen 20 showing a popular spreadsheet application program (EXCEL 5.0) that operates within a graphical user interface (WINDOWS 3.1). A cursor 22 is provided to allow a user to select different commands from the program's tool bars 24. The cursor may also be used to select menu items from a pull-down menu bar 26 located at the top of the screen. As is common in application programs that operate within a GUI, the workspace that is displayed to a user on a screen is significantly smaller than the overall workspace in which the user may manipulate text, data, or images. For example, in the spreadsheet application shown in FIG. 1, only columns A through L and rows 1 through 25 of the spreadsheet are displayed to the user. The entire spreadsheet, however, extends beyond column L or row 25. To allow a user to view other portions of the spreadsheet, a scroll bar 28 and a pan bar 30 are therefore provided to the user.

To scroll within the spreadsheet and view different rows, a user moves cursor 22 to vertical scroll bar 28. Typically, two different techniques are available to scroll within the document. A user may position the cursor 22 over either of the scroll arrows 32, and depress a button on the user input device. Selecting one of the scroll arrows in this manner causes the display to scroll upwards or downwards row-by-row according to the arrow over which the cursor is positioned. In this manner, a user may view additional rows within the spreadsheet. Alternatively, a user may position the cursor over a scroll box 34 located within scroll bar 28. The scroll box 34 provides a graphical representation of the vertical location within the current workspace. If scroll box 34 is located near the top of the scroll bar, the user is located working near the top of the workspace. If scroll box 34 is located near the bottom of the scroll bar, the user is operating near the bottom of the workspace. Selecting the scroll box 34 and dragging the scroll box to a desired position in the scroll bar 28 therefore allows the user to jump to a desired vertical position within the workspace.

Pan bar 30 operates in a similar manner to the scroll bar. A user may move cursor 22 to a location over one of the pan arrows 36 in order to selectively pan left or right within the display. In the representative spreadsheet program shown in FIG. 1, a pan left or right corresponds to shifting the columns left or right to bring other columns of the workspace onto the screen viewed by the user. A pan box 38 is also provided to allow a user to directly move to a desired horizontal position within the workspace.

It will be appreciated that scrolling or panning within the GUI environment shown in FIG. 1 is a relatively complex task. A user must manipulate the user input device to move cursor 22 to a position over one of the desired scroll arrows 32, pan arrows 36, scroll box 34, or pan box 38. The user must then select the arrow or box over which the cursor is located by depressing a button on the user input device. In response, the portion of the workspace displayed by the program shifts accordingly. The user must then manipulate the user input device to return the cursor 22 to a desired position within the workspace to continue working. The overall process requires a high degree of visual acuity, as the user must pay close attention to the location of cursor 22 in order to position the cursor over the appropriate arrow or box. The inclusion of scroll and pan bars on the margins of the screen also detract from the overall workspace that is visible and therefore accessible by the user. It would therefore be desirable to develop a user input device that eliminated the need for scroll and pan bars.

Even for programs that operate in a GUI environment without scroll or pan bars, the GUI typically requires a user to move the user input device to one extreme or the other in order to view other portions of the workspace. For example, in some GUIs the user must move the cursor to the top of the screen in order for the workspace to scroll downward. Similarly, to view a portion of the workspace to the right of the current window, the user must move the cursor to the far right hand side of the screen. Once the cursor reaches the edge of the displayed screen, the workspace typically scrolls beneath the cursor to allow the user to view areas not displayed in the original screen. The movement of the user input devices to the extremes is typically time consuming and burdensome. After scrolling to the desired location, the cursor must be returned to the desired workpoint within the displayed screen. It would therefore be advantageous to develop a user input device that would allow a user to move within a larger workspace without having to move the cursor to the extremes of the displayed screen.

SUMMARY OF THE INVENTION

The present invention is a touchpad designed to improve a user's ability to interact with a graphical user interface (GUI) on a computer. In its broadest form, the touchpad comprises a plurality of regions, each of the regions independently generating movement information that may be linked to a function or command within the GUI. The regions are physically or visually separated from each other so that a user may easily identify in which region he or she is operating. A user may therefore easily move between each of the regions in order to implement the selected function or command within the GUI.

Preferably, the touchpad comprises three regions: a cursor control region, a pan control region, and a scroll control region. The cursor control region operates like a conventional computer touchpad. Movement within the cursor control region allows a user to move a corresponding cursor in the GUI. The pan control region allows a user to pan within the GUI environment by contact or movement within the pan region. The scroll control region allows a user to scroll within the GUI environment by contact or movement within the scroll region. Preferably, the pan control region is located below the cursor control region, and the scroll control region is located to the right of the cursor control region.

In accordance with one aspect of the invention, the pan control region and the scroll control region are separated from the cursor control region by panes formed in the touchpad case. The panes between the regions provide the user a tactile indication of the region in which the user is operating. When the regions are separated by portions of the touchpad case, each of the regions may be comprised of a separate touchpad member or all the regions may be mapped to a single touchpad member. In the former case, the signals from each touchpad member are separately monitored by the touchpad and control packets provided to the computer indicative of the region of contact in order to control the GUI function that corresponds to the contacted region. In the latter case, the touchpad determines from an X,Y location the region in which the user contacted the touchpad member and from the location provides appropriate control packets to the computer to be used in implementing the desired function.

In accordance with another aspect of the invention, the three regions may be contiguously located on a single touchpad member. When the three regions are contiguous, visual or tactile information is provided to the user to identify in which region the user is operating. In one embodiment of the invention, a painted or printed stripe is used to divide a single touchpad member into the cursor control, scroll control, and pan control regions. The user identifies in which region he or she is operating based on the readily apparent visual cues provided by the stripes. In another embodiment in the invention, ridges may be formed in the surface of the touchpad member in order to visually and tactilely divide the touchpad into different operating regions. A user may therefore identify in which region the user is operating based on feeling the ridges as the user moves their fingertips across the surface of the touchpad member.

In accordance with another aspect of the invention, a function region can be defined in the touchpad in addition to the cursor control, scroll control, and pan control regions.

The function region may be linked to various functions contained in the GUI through appropriate software. The user may implement the mapped functions by pressing the appropriate location within the function region.

In accordance with still another aspect of the invention, the touchpad members may be pressure sensitive, or responsive in the Z-axis. The Z-axis sensitivity may be linked to certain GUI functions. For example, the rate of scrolling or panning may be varied by varying the amount of pressure placed in the touchpad scroll and pan control regions.

Significant advantages arise from the touchpad construction disclosed herein. Primarily, the use of a separate cursor control region, pan control region, and scroll control region improves a user's ability to operate an application program having a GUI. By linking certain often-used functions, such as scrolling and panning, with designated touchpad regions, the user can accomplish desired functions quickly and efficiently. Moreover, graphic icons or buttons that typically had to be displayed in the GUI may now be removed from the GUI. For example, the scroll and pan bars that are ubiquitous in many current application programs could be removed from the user display. Removing the graphic icons increases the overall workspace accessible by the user, and improves the visual appearance of the interface. The disclosed touchpad design therefore improves the overall efficiency and user friendliness between a user and a GUI.

BRIEF DESCRIPTION OF THE DRAWING

The foregoing aspects and many of the attendant advantages of this invention will become more readily appreciated as the same becomes better understood by reference to the following detailed description, when taken in conjunction with the accompanying drawings, wherein:

FIG. 6 is a perspective view of a second embodiment of a touchpad having scroll and pan control regions wherein the scroll and pan control regions are designated by visual cues;

FIG. 7 is a perspective view of a third embodiment of a touchpad having scroll and pan control regions wherein the scroll and pan control regions are designated by tactile cues;

FIG. 8 is a perspective view of a fourth embodiment of a touchpad having scroll control, pan control, and function regions;

FIG. 9 is an exploded perspective view of a fifth embodiment of a touchpad having scroll and pan control regions, wherein each region is constructed with a separate touchpad member;

DETAILED DESCRIPTION OF THE PREFERRED EMBODIMENT

Figure 1:
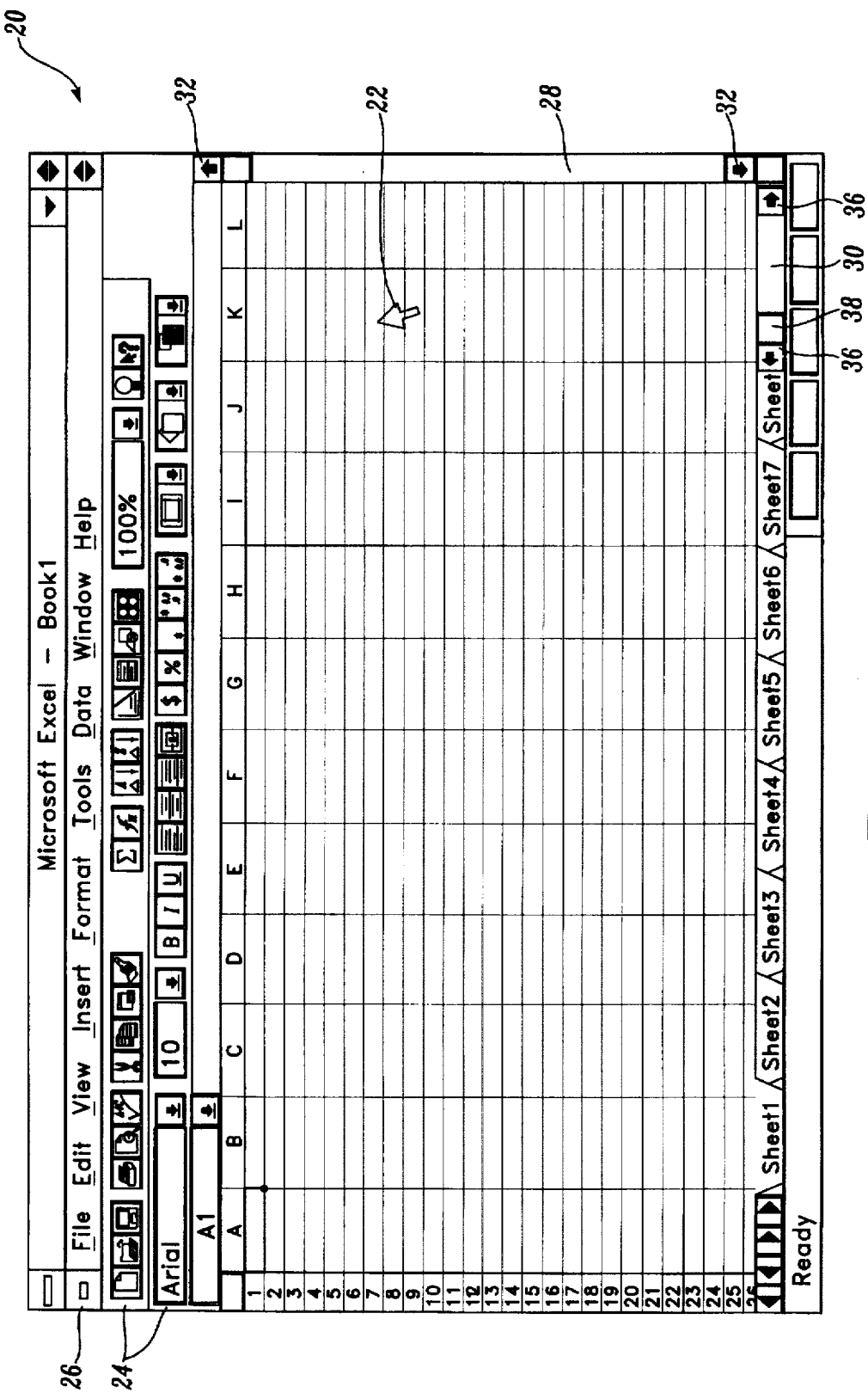
FIG. 1 is a representative screen from an application program having a graphical user interface.
Figure 2:
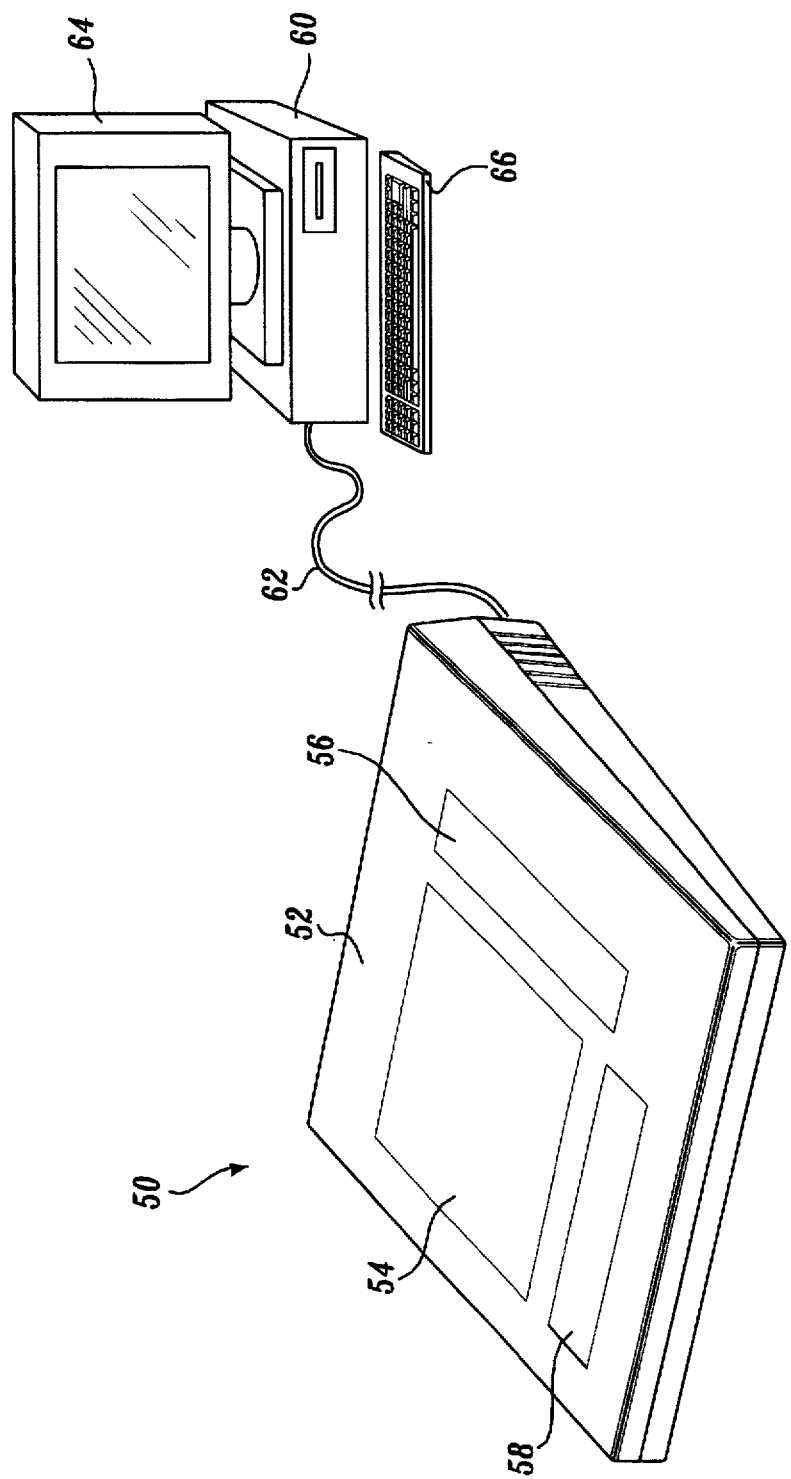
FIG. 2 is a perspective view of a preferred embodiment of a touchpad having cursor control, scroll control, and pan control regions.

FIG. 2 is a perspective view of a touchpad 50 of the present invention having multiple regions that may be coupled by software so that each region is linked to a command or function in a graphical user interface (GUI). Touchpad 50 is connected to a computer 60 by a cable 62. Computer 60 includes a monitor 64, a keyboard 66, an operating system, and a touchpad driver for interfacing with the touchpad. Computer 60 also contains a GUI to allow a user to operate various application programs on the computer in a graphical environment. As will become apparent below, touchpad 50 is arranged to improve the user's efficiency when operating within the GUI on computer 60.

Touchpad 50 is preferably divided into three regions from which a user may enter relative movement information that may be linked to different functions or commands within the GUI. A cursor control region 54 is centrally disposed within touchpad case 52. The cursor control region is generally rectangular in shape and corresponds to the screen dimensions of monitor 64, or alternatively, to a region of the monitor screen that surrounds a displayed cursor. Application of force by a user within the cursor control region generates a positional signal corresponding to the X,Y location of the force within the region. The force may be from a dedicated stylus, a pen, a user's finger, or any other pointing device. The X,Y positional signal is converted by firmware operating in the touchpad into cursor control packets reflecting the relative movement of the contact point with the touchpad. The cursor control packets are provided to computer 60 over cable 62.

The cursor control packets are used to govern cursor movement within the GUI of computer 60. Using appropriate software described below, the movement of the contact point within the cursor control region 54 causes a corresponding movement of the cursor within the GUI on the computer monitor 64. For purposes of this description, the following reference coordinate system will be used. "Top" will refer to the top of the touchpad, or the portion of the touchpad that is farthest away from the user. The corresponding "top" of the screen will refer to the uppermost portion of the display that is visible to the user on the monitor. The "bottom" of the touchpad will refer to the portion of the touchpad that is closest to the user. The corresponding "bottom" of the screen will refer to the lowest portion of the display that is visible to the user on the monitor. "Left" and "right" on both the touchpad and the monitor will refer to the standard orientation of left and right when a user is facing the touchpad or the monitor. Using the touchpad 50, a user may easily move the cursor to a desired location on the monitor by appropriate contact and movement within the cursor control region 54. For example, movement toward the top of the touchpad will cause the cursor to move toward the top of the screen.

Located adjacent cursor control region 54, and vertically oriented with respect to the right side of the cursor control region, is a scroll control region 56. Preferably, scroll control region 56 is a rectangular region having approximately the same vertical height as the cursor control region. Application of force within the scroll control region 56 generates scroll control packets that are representative of the relative movement of the user contact point within the scroll control region. The scroll control packets are provided to computer 60 over cable 62. Using a technique described in further detail below, the scroll control packets may be used to govern scrolling, or up and down movement, of the workspace within the GUI. Preferably, when a user moves the contact point upwards in the scroll control region, the GUI causes the workspace to move downwards on the screen. The upwards scrolling operation therefore corresponds to a user "looking" upwards in the workspace. Similarly, a user may move the contact point downwards in the scroll control region 56. Downwards movement of the contact point causes the workspace to scroll upwards on the screen.

Located below the cursor control region 54 is a pan control region 58. Preferably, pan control region 58 is a rectangular region having the same horizontal width as the cursor control region. Application of force within the pan control region 58 generates pan control packets that are representative of the relative movement of the user contact point within the pan control region. The pan control packets are provided to computer 60 over cable 62. As will be further described below, the GUI may be programmed to interpret the pan control packets to control panning, or left and right movement, within the computer GUI. Moving the contact point left in the pan control region would thereby cause the GUI to pan to the left. That is, the displayed portion of the workspace would shift to the right, bringing new portions of the workspace that were located to the left of the displayed portion into view. Similarly, movement of the contact point to the right in the pan control region would generate a pan control packet causing the GUI to pan to the right. The displayed portion of the workspace would therefore move to the left as viewed by the user, bringing the portion of workspace located to the right of the displayed portion into view.

The use of multiple touchpad regions improves the overall user/computer interface. The addition of a scroll control region 56 and a pan control region 58 eliminates the need to use or even display a scroll or pan bar in the GUI. The overall size of a workspace that may be displayed to a user on a giving monitor can thereby be increased. A user may also scroll and pan within a GUI more easily since the user does not have to manipulate the cursor and position the cursor over the pan and scroll bars in order to change the portion of the workspace that is displayed on the monitor.

Figure 3:
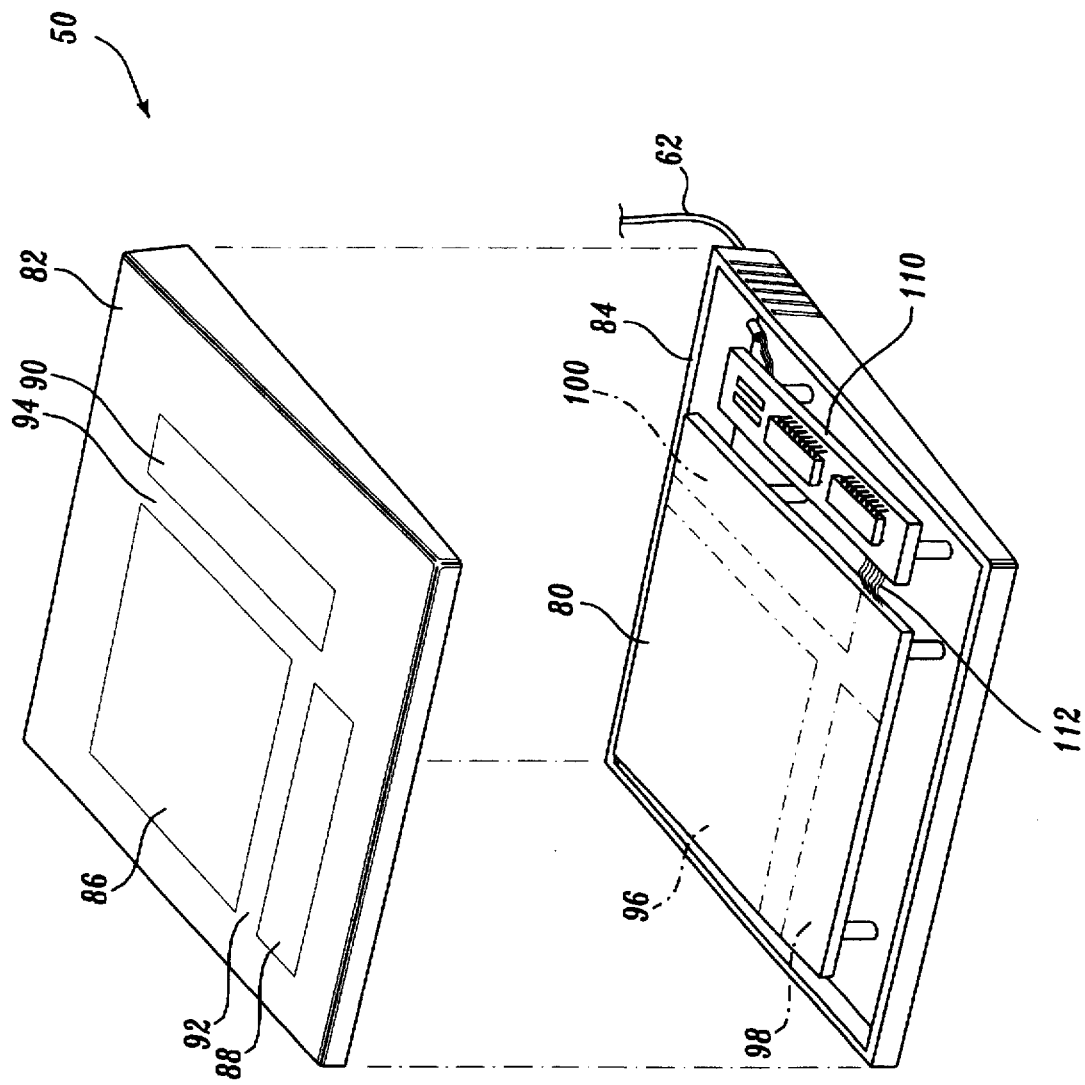
FIG. 3 is an exploded perspective view of the preferred embodiment of the touchpad shown in FIG. 2.

Dedicated hardware and software is required to interface the three regions of touchpad 50 with the computer's GUI. As shown in the exploded view of FIG. 3, preferably a single touchpad member 80 is provided to form the three touchpad regions. Case 52 comprises an upper half 82 and a lower half 84. The upper half 82 of the case is formed with three openings to define the three regions of the touchpad. Opening 86 defines the size of the cursor control region, opening 88 defines the size of the pan control region, and opening 90 defines the size of the scroll control region. Since touchpad members are preferably manufactured in square or rectangular form, the size of touchpad member 80 is selected so that it extends beneath all three openings in the upper cover 82. To prevent shifting of the touchpad member, touchpad member 80 is fixed to lower cover 84.

The construction of upper cover 82 prevents a user from contacting the entire surface of touchpad member 80. Panes 92 and 94 are formed between the cursor control region, pan control region, and scroll control region. The panes prevent a user from directly contacting the portion of the touchpad member located beneath the panes. The location that the user contacts touchpad member 80 will therefore determine the region in which the contact occurred. Area 96 corresponds to the cursor control region, area 98 corresponds to the pan control region, and area 100 corresponds to the scroll control region.

Those skilled in the art will recognize that touchpad member 80 may rely on one of several different technologies to convert the force applied to the touchpad member into an electric signal representative of the location of the force. One technology relies on detecting a change in capacitance across the touchpad member. Another technology relies on detecting a change in resistance across the touchpad member. Touchpads have become increasingly popular because it is also possible to construct a touchpad member having sensitivity in the Z-axis. That is, in addition to producing an X,Y positional signal indicative of the location of the applied force on the touchpad member, some touchpad members also generate an additional signal that is proportional to the magnitude of the force applied to the touchpad member. As discussed below, the force sensitivity may also be linked to control functions or commands of a GUI.

The force applied to touchpad member 80 generates an electrical signal indicative of the X,Y location where the contact occurred. A circuit board 110 is connected to the touchpad member by a cable 112. Circuit board 110 contains a processor, associated circuitry, and a firmware routine to convert the X,Y location and movement of the contact point by the user into appropriate control packets for transmission to the computer over cable 62. The control packets contain data corresponding to the user's movement on the touchpad, and are interpreted by the computer to control commands or functions in the GUI. Current computer/user input device interfaces dictate transmitting the control packets over an RS-232 interface at 1200 baud, one stop bit, and no parity bit. The transmission scheme may be varied, however, depending on the particular computer and capabilities of the touchpad.

The format of the control packets generated by the touchpad is provided in the following Table 1:

TABLE 1

|        | B6 | B5 | B4 | B3 | B2 | B1 | B0 |
|--------|----|----|----|----|----|----|----|
| byte 1 | 1  | L  | R  | y7 | y6 | x7 | x6 |
| byte 2 | 0  | x5 | x4 | x3 | x2 | x1 | x0 |
| byte 3 | 0  | y5 | y4 | y3 | y2 | y1 | y0 |
| byte 4 | 0  | 1  | 1  | 0  | 0  | P  | S  | where

L=left touchpad button (1 if pressed)

R=right touchpad button (1 if pressed)

P=pan bit

S=scroll bit x0–x7=value indicative of relative x-coordinate movement y0–y7=value indicative of relative y-coordinate movement The identity of the control packets is dictated by the settings of the pan and scroll bits. If the P and S bits are both set to 0, the control packet is a cursor control packet. If P=1 and S=0, the control packet is a pan control packet. And if P=0 and S=1, the control packet is a scroll control packet. The method of setting the P and S bits is described in further detail below. Preferably, each control packet is four bytes in length. It will be appreciated, however, that the control packet may be expanded depending on the touchpad construction. For example, a touchpad member that is sensitive in the Z-axis requires an additional byte to provide a value indicative of the relative z-coordinate movement of the touchpad member.

Figure 4:
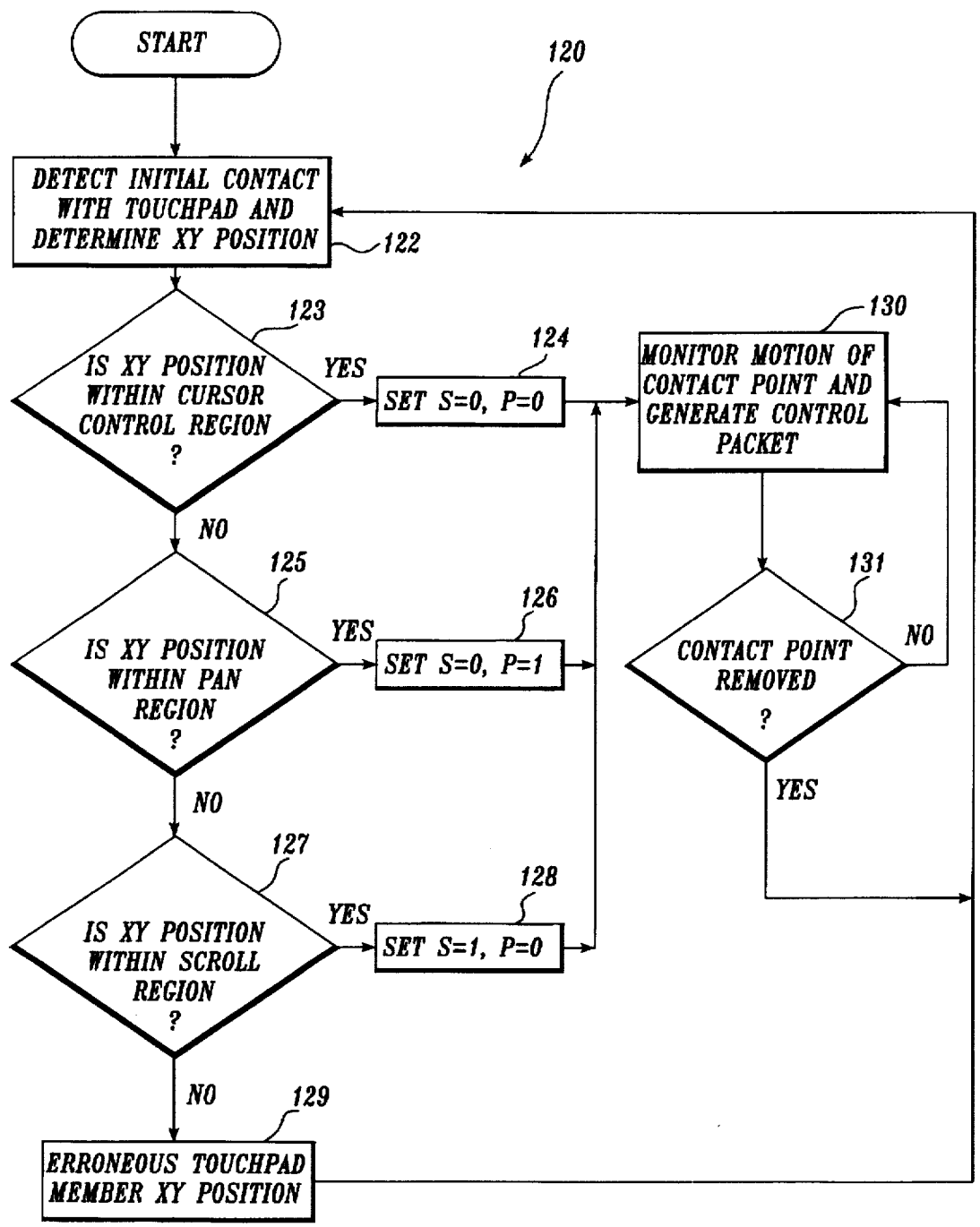
FIG. 4 is a flow chart of an exemplary firmware routine for processing signals generated by the preferred touchpad embodiment and producing control packets.

FIG. 4 is a flow chart of an exemplary firmware routine 120 that is operative in touchpad 50 to convert the X,Y positional information from the touchpad member into the control packets for transmission to computer 50. At a block 122, a control signal is received from the touchpad member that is indicative of the X,Y position of the contact with the touchpad member. At a decision block 123, a test is made to determine whether the X,Y position of the force indicates that the contact occurred within the cursor control region. If the touchpad member contact is in the cursor control region, at a block 124 the P and S bits are each set to 0. The routine then continues to a loop comprised of blocks 130 and 131, where the contact point with the touchpad member is monitored. As the user moves the contact point around the touchpad member, at block 130 control packets are generated with x0–x7 and y0–y7 bit values that are indicative of the relative movement of the contact point. At block 131, a test is made to determine if the user has ceased contacting the touchpad member. If the user has removed contact, the routine returns to block 122 to detect the next contact with the touchpad member. If the user continues to move the contact point, a continuous stream of cursor control packets are generated at block 130 and provided to the computer.

If the X,Y position indicates that the initial contact with the touchpad member is not within the cursor control region, at a decision block 125 a test is made to determine if the X,Y position indicates that the contact point is within the pan control region. If the X,Y position indicates that contact is being made within the pan control region, the S bit in the control packet is set to 0 and the P bit in the control packet is set to 1 a block 126. The routine then continues to the loop comprised of blocks 130 and 131, where the contact point with the touchpad member is monitored and pan control packets are generated and transmitted to the computer.

If the X,Y position indicates that the initial contact with the touchpad member is not within the pan control region, at a decision block 127 a test is made to determine if the X,Y position indicates that the contact point is within the scroll control region. If contact is being made within the scroll control region, the S bit in the control packet is set to 1 and the P bit in the control packet is set to 0 at a block 128. The routine then continues to the loop comprised of blocks 130 and 131, where the contact point with the touchpad member is monitored and scroll control packets are generated and transmitted to the computer.

If the X,Y position does not indicate that contact is being made within the scroll control region, at a block 129 an error message is generated by the routine to indicate that an erroneous X,Y position has been received. The erroneous information may be ignored, or appropriate error messages provided to the computer to indicate that the touchpad may be malfunctioning.

Figure 5:
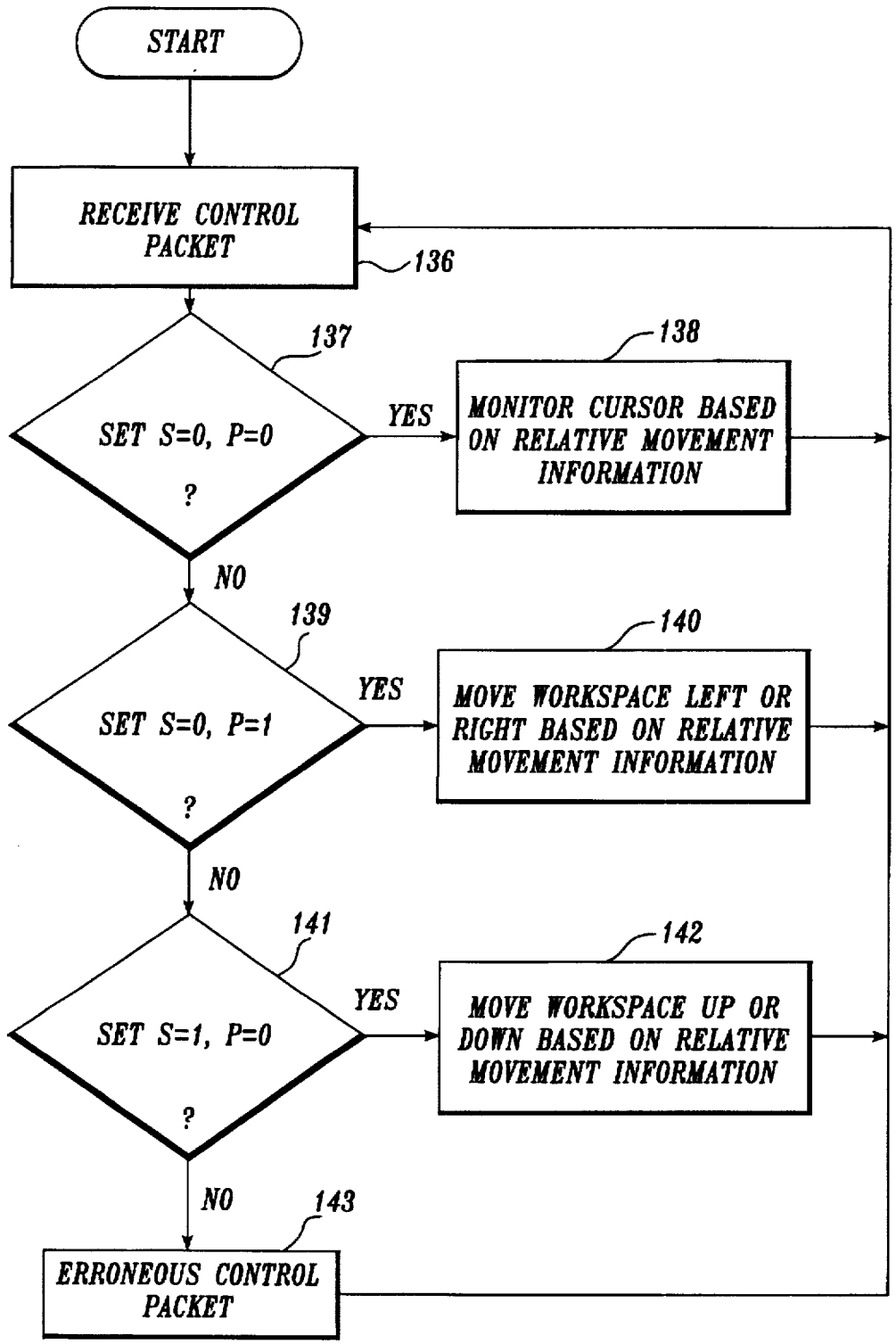
FIG. 5 is a flow chart depicting the interpretation of the control packets by a computer connected to the touchpad.

FIG. 5 is a flowchart depicting the interaction between the touchpad driver routine, the operating system, and the GUI in interpreting the received control packets. At a block 136, a control packet is received from the touchpad. At a block 137, a test is made of the S and P bits. If both the S and P bits are 0, at a block 138 the cursor in the GUI is moved based on the received X,Y relative movement information. A user may therefore guide the cursor around the GUI by corresponding contact and movement in the cursor control region of the touchpad.

If the control packet does not contain cursor control information, at a block 139 a test is made to determine if the S bit is set to 0 and the P bit set to 1. If S=0 and P=1, at a block 140 the workspace is moved in the GUI to the left or to the right as viewed by the user. It will be appreciated that several different techniques may be used to map the contact of the user within the pan control region to the panning movement of the workspace. For example, movement of the contact point to the left in the pan control region may cause the workspace to slowly pan to the left. Conversely, movement to the right in the pan control region would cause the workspace to slowly pan to the right. Panning would continue for as long as the user maintained contact with the pan control region. Alternatively, the amount of panning can be directly related to the magnitude of the user's contact within the pan control region. Traversing a greater distance in the pan control region towards the margins of the region would result in a large panning action. Traversing a shorter distance would cause a slow pan left or right, depending upon the direction of the contact point movement in the pan control region. In-between these two extremes, a linear or logarithmic panning action in the desired direction would result. Motion such as sliding a finger within the pan region would therefore produce a panning action that increased in speed the farther the sliding motion traversed. In large part, the desired panning action will depend upon the typical motion of the user within a given application program. Different panning sensitivities or mappings may therefore be incorporated in the GUI in order to vary the panning according to the particular application.

The panning action may also be varied by allowing a user to combine the panning input from the touchpad with a keyboard input. For example, depressing the "control" key on the computer keyboard while performing a right pan may cause the GUI to pan to the left edge of the workspace. Alternatively, depressing the "alt" key while performing a pan may allow the user to "pan", or switch, between different workspaces. Other keyboard/touchpad combinations will be apparent to those skilled in the art.

If the control packet does not contain panning information, at a block 141 a test is made of the control packet to determine if the S bit is set to 1 and the P bit set to 0. If S=1 and P=0, at a block 142 the workspace is moved up or down in the GUI as viewed by the user. It as viewed by the user. It will be appreciated that contact within the scroll control region may be mapped using the same techniques as contact within the pan control region. That is, the scrolling may be varied depending on the relative motion within the scroll control region. The sensitivity and type of scrolling may also be changed according to the particular application program being used by the user.

If the control packet is corrupted or fails to contain an S or P bit, at a block 143 an error message is generated. The control packet is discarded, and an error message provided to the user to indicate that the touchpad or touchpad interface is malfunctioning.

It will be appreciated that the status of the S and P bits are set based on the location of the initial contact point on the touchpad member. The value of the bits remain unchanged as long as the user continues to maintain contact with the touchpad member. As a result, the entire touchpad surface may be used to control cursor movement, panning, or scrolling. For example, if the user initially touches the touchpad member in the cursor control region, both the S and P bits are set to 0. If the user's contact point with the touchpad traverses into adjacent panning or scrolling control regions, cursor control packets will continue to be generated and the cursor will continue to be controlled by the user movement. Similarly, an initial contact with the pan or scroll control regions will cause any continuous and subsequent movement that traverses into the cursor control region to continue to control the panning or scrolling. Especially when the scroll and pan regions are contiguous with the cursor control region, the operation of the touchpad in this manner expands the available region for control of the desired function.

The touchpad construction described above greatly increases the user's efficiency when operating within a GUI. The addition of scroll and pan control regions minimizes the amount of movement to the outer edges of the screen that a user must perform. Moreover, because panes 92 and 94 in the upper cover of the case form distinctive tactile ridges for the user, the user may determine when he or she is located within the scroll and pan control regions without having to look at either the screen or the touchpad. The user may therefore concentrate on the work being performed, rather than on the tools for moving the workspace in the GUI.

It will be appreciated that several different modifications may be made to the preferred touchpad design that fall within the spirit and scope of the present invention. For example, FIG. 6 is a second embodiment of a touchpad 150 having cursor, scroll, and pan control regions. In the second embodiment, the upper half 152 of the touchpad case is formed with a single opening allowing access to touchpad member 80. Rather than having panes to separate the various regions, a vertical line 154 and a horizontal line 156 are painted or otherwise imprinted directly on touchpad member 80. The vertical and horizontal lines divide the touchpad member 80 into four regions: a cursor control region 158, a pan control region 160, a scroll control region 162, and a function region 164. The cursor, pan, and scroll control regions operate as described above. Rather than relying upon the tactile feedback provided by the panes in the case, however, a user must visually examine the touchpad to ensure that the user is applying contact to the touchpad member in the appropriate region. Function region 164 may be linked to a particular function or command in the GUI. For example, function region 164 may operate as a button to allow a user to implement a desired command by tapping on the region. Alternatively, function region 164 may remain unmapped so that contact with that portion of the touchpad member does not implement any function in the GUI.

FIG. 7 is a third embodiment of a touchpad 180 having a single opening formed in the upper half of the case over touchpad member 80. In the third embodiment, the surface of touchpad member 80 is formed with integral ridges to delineate the cursor, scroll, and pan control regions. A horizontal ridge 182 and a vertical ridge 184 divide the touchpad member into a cursor control region 186, a pan control region 188, and a scroll control region 190. The ridges provides tactile information to a user to allow the user to determine by touch in which region contact is made with the touchpad. Tactile information is also provided to the user by textured edges 192 and 194 formed in the opening in the upper half of the touchpad case. The textured edges abut the pan and scroll control regions and indicate to a user that the user is located in the adjacent pan or scroll regions when the texturing is felt. The manner in which each of the regions operates is similar to that discussed above.

FIG. 8 is a fourth embodiment of a touchpad 200 having four defined regions. In addition to a cursor control region 202, a scroll control region 204, and a pan control region 206, a function region 208 is provided adjacent the cursor control region. Preferably, function region 208 is a rectangular region located to the left side of the cursor control region and having approximately the same vertical height as the cursor control region. While the function region is shown adjacent the left side of the cursor control region 202, it will be appreciated that the function region may be located at other locations convenient to the user. For example, the function region may be located above the cursor region or to the right of the scroll control region.

Function region 208 may serve a variety of purposes depending upon the particular application program. For example, the function region may be tied to the menu bar of an application program to allow a user to pull down and implement commands in the menu bar. Alternatively, the function region may be divided into a number of "soft" buttons that are each linked to selected command in the application program. A user could implement the selected command by contact with the function region at the appropriate button. Moreover, function region 208 may also be tied to a zoom tool to allow a user to zoom in and out of a workspace in order to achieve a desired view. The particular use of function region 208 may be changed for each application by altering the software routine linking the function region to the GUI.

Those skilled in the art will recognize that the addition of a function region requires defining a bit (a function bit) in the control packets that are generated by the touchpad. The function bit is set when the initial contact point of the user falls within the function region.

FIG. 9 depicts an alternate construction of the preferred touchpad embodiment. In the alternate construction, rather than having a single touchpad member located beneath openings 86, 88, and 90 in the upper cover of the touchpad 50, three touchpad members are provided. A cursor control touchpad member 220 is located beneath the cursor control opening 86, a pan control touchpad member 222 is located beneath the pan control opening 88, and a scroll control touchpad member 224 is located beneath scroll control opening 90. When three touchpad members are provided, interfacing the touchpad with the GUI is simplified. Rather than having to determine the region from a detected X,Y position, contact with a particular touchpad member immediately indicates to the touchpad firmware in which region the user is operating. Further, because multiple touchpad members are provided, it would be possible to allow the user to perform simultaneous cursor and workspace movements. For example, a user may be able to move diagonally within a work space by simultaneous contact with both the scroll control region and the pan control region. The use of multiple touchpad members are required to implement simultaneous functions, because present touchpad members are unable to accurately distinguish between multiple contact points on the surface of the touchpad member.

Figure 10:
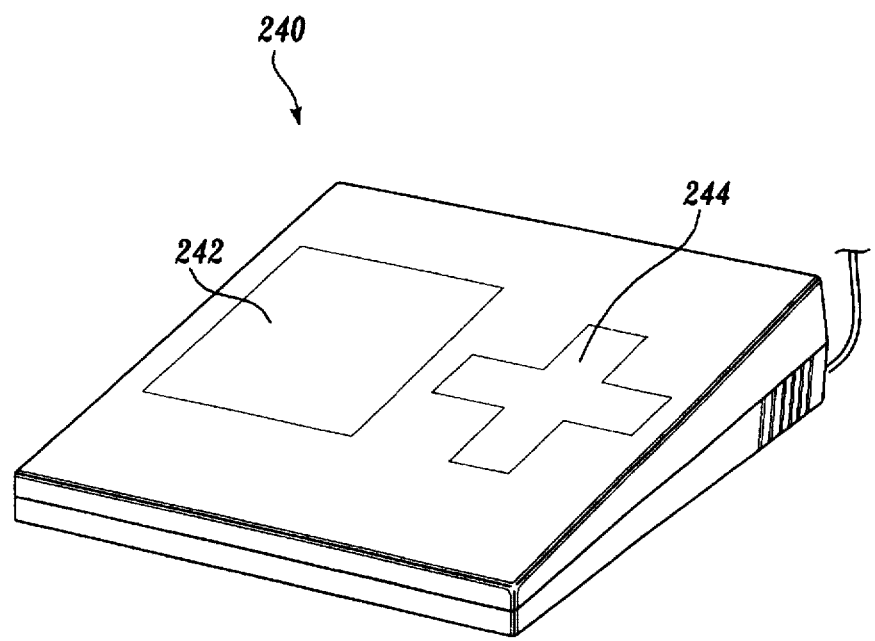
FIG. 10 is a perspective view of a sixth embodiment of a touchpad with scroll and pan control regions wherein the scroll and pan control regions are arrayed as a cross.

FIG. 10 portrays a sixth embodiment of a touchpad 240 having scroll and pan control regions. Touchpad 240 includes a cursor control region 242 to allow a user to manipulate a cursor. Positioned adjacent the cursor control region are scroll and pan control regions which overlap in the shape of a "plus"(+) 244. The horizontal bar of the "plus" corresponds to the pan control region, and the vertical bar of the "plus" corresponds to the scroll control region. Appropriate contact of the user within the plus would allow the user to scroll or pan within the document. To avoid ambiguity, the region where the horizontal bar crosses the vertical bar is preferably not mapped to control either scrolling or panning. Those skilled in the art will recognize that many arrangements of the scroll and pan control regions are possible, depending on the particular application program and the desires of the user.

Figure 11:
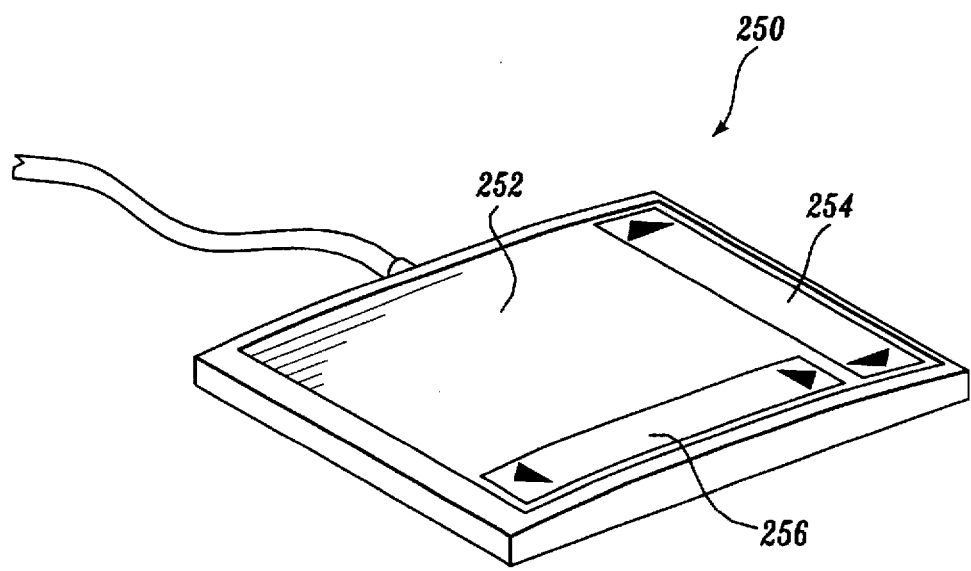
FIG. 11 is a perspective view of a seventh embodiment of a touchpad with scroll and pan regions designated by visual cues.

FIG. 11 portrays a seventh embodiment of a touchpad 250 having scroll and pan control regions. Touchpad 250 includes a cursor control region 252 to allow the user to manipulate a cursor. A portion of the touchpad member is designated by visual markings as a scroll control region 254 and a pan control region 256. Each region is spaced from the margins of the touchpad member, and includes arrows printed within each region indicative of the region function. The surface of the touchpad member that forms the scroll control region 254 and pan control region 256 is also textured. Texturing the surface of the scroll and pan regions differently from the cursor control region 252 provides tactile feedback to the user about the region in which they are operating. As discussed above, the touchpad software is configured so that initial contact by the user within the cursor control region 252 allows the user to use the entire surface of the touchpad member, including scroll control region 254 and pan control region 256, to enter cursor movement information. Similarly initial contact within the pan and scroll control regions allows the user to use the entire surface of the touchpad member, including the cursor control region, to enter panning and scrolling movement information.

Figure 12:
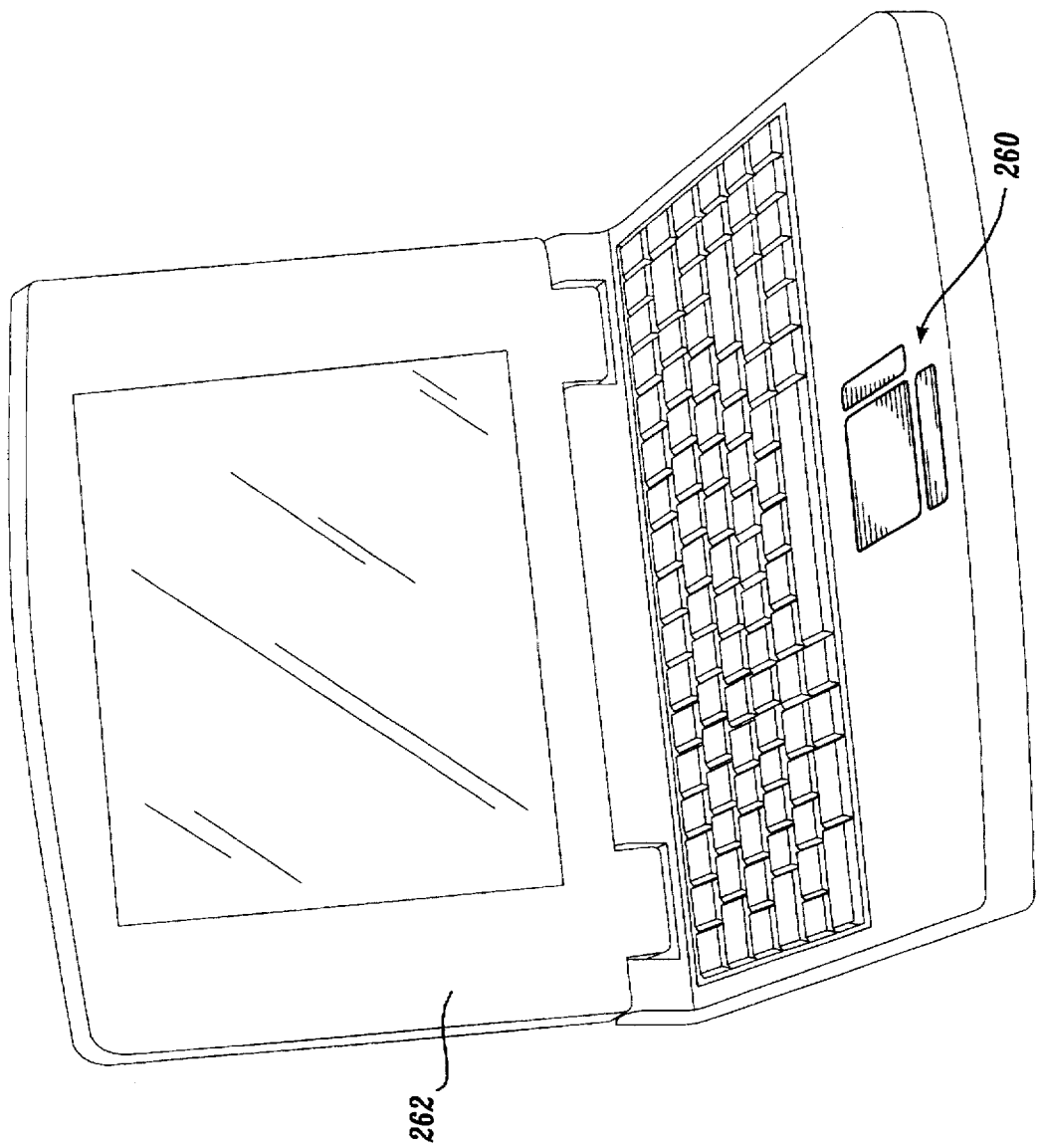
FIG. 12 is a perspective view of a portable computer incorporating the preferred embodiment of the touchpad with scroll and pan control regions.

While each of the above embodiments was discussed with respect to a stand-alone user input device, it will also be appreciated that the touchpad designs of the present invention may be directly incorporated into a computer keyboard or housing. For example, FIG. 12 depicts a portable computer 262 having an integral touchpad 260 of the present invention. Particularly in portable computers, where it is desirable to have convenient means to operate a cursor, incorporating the touchpad directly into the computer case facilitates the users ability to operate within a GUI.

Figure 13:
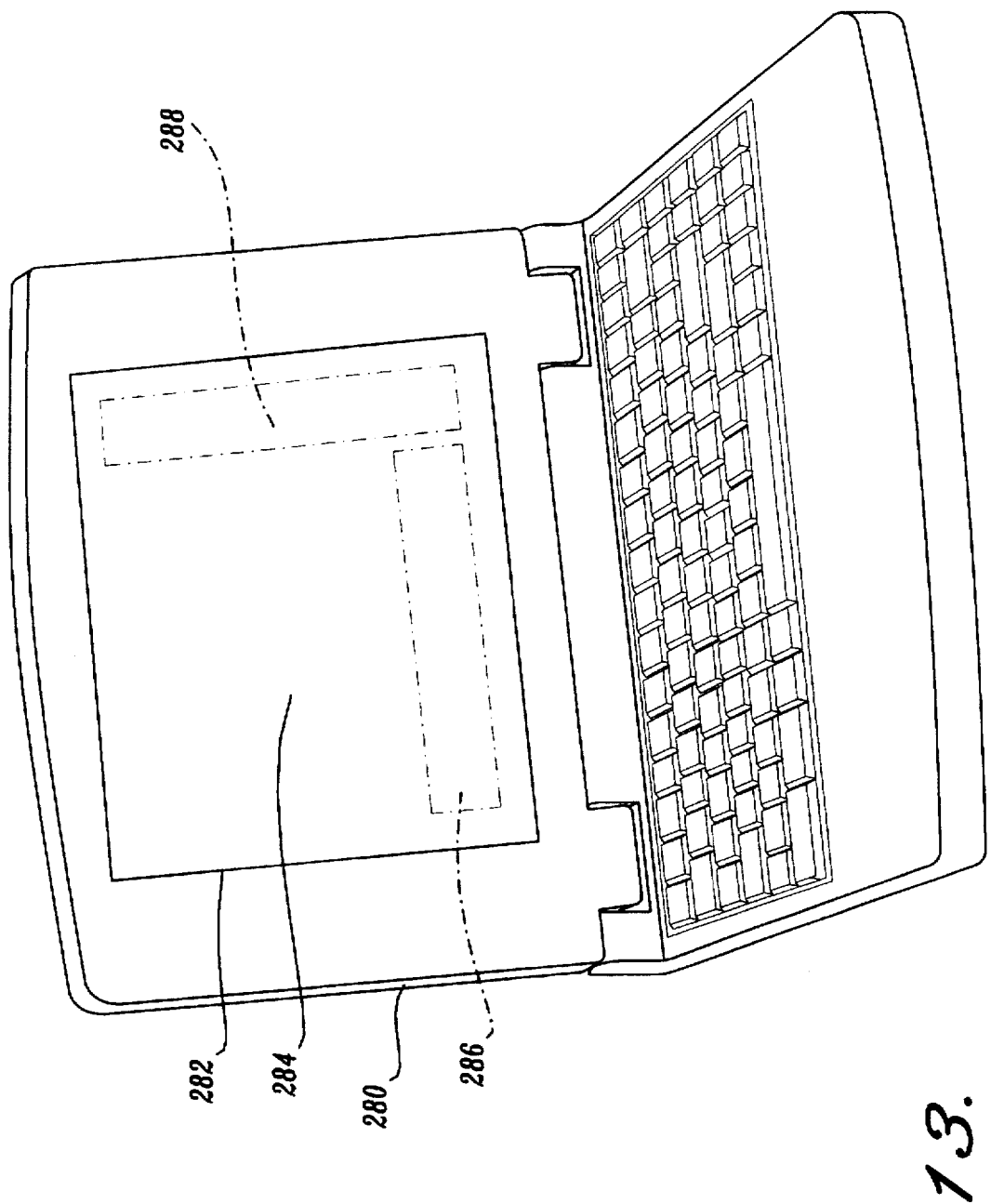
FIG. 13 is a perspective view of a portable computer having a touchscreen with a cursor control region, a scroll control region, and a pan control region.

Alternatively, the touchpad layout may also be directly incorporated into a touchscreen on a computer. As shown in FIG. 13, a portable computer 280 is provided with a touchscreen 282. The touchscreen contains a separate cursor control region 284, a pan control region 286, and a scroll control region 288. The regions may be designated with visual or tactile cues as discussed above. User contact with the touchscreen at the appropriate location allows control of the cursor, panning, or scrolling.

While the preferred embodiment of the invention has been illustrated and described, it will be appreciated that various changes can be made therein without departing from the spirit and scope of the invention. In the preferred embodiment of the invention, the scroll control and pan control regions are linked to scrolling and panning functions in the GUI. It will be appreciated, however, that the regions may alternatively be linked to other commands or functions within the GUI. For example, the scroll and pan regions could be linked to a menu bar or a tool bar. The functions to which the scroll and pan regions are linked may also be varied based on the particular application program.

It will also be appreciated that the position of the scroll control, pan control, and function regions may be located other than as disclosed in the preferred embodiment. For example, a "left-handed" touchpad may be constructed with the scroll control region located to the left of the cursor control region. The pan control region may be located above, rather than below, the cursor control region. And the function region may be positioned above the cursor control region and horizontally, rather than vertically, oriented. Consequently, within the scope of the appended claims, it will be appreciated that the invention can be practiced otherwise than specifically described herein.

The embodiments of the invention in which an exclusive property or privilege is claimed are defined as follows:

1. A touchpad for controlling functions of a graphical user interface in a display area on a computer monitor display screen associated with a computer, the graphical user interface including a cursor within the display area, the touchpad comprising:

(a) a cursor control region that is not within any display area of the display screen, the cursor control region generating and providing a control signal to the computer based on a user input that falls within the cursor control region, the control signal controlling a position of cursor in the graphical user interface;

(b) a pan control region that is not within any display area of the display screen and adjacent the cursor control region, the pan control region generating and providing a pan control signal to the computer based on a user input that falls within the pan control region, the pan control signal causing at least a portion of the graphical user interface display to pan; and (c) a scroll control region that is not within any display area of the display screen and is adjacent the cursor control region, the scroll control region generating and providing a scroll control signal to the computer based on a user input that falls within the scroll control region, the scroll control signal causing at least a portion of the graphical user interface display to scroll.

2. The touchpad of claim 1, wherein the pan control region has a left portion and a right portion, a left pan corresponding to a user input towards the left portion of the pan control region, and a right pan corresponding to a user input towards the right portion of the pan control region.

3. The touchpad of claim 2, wherein the pan control region is pressure sensitive, a rate of panning being proportional to a variable amount of pressure applied to the pan control region by the user input.

4. The touchpad of claim 2, wherein the pan control region further has a central portion located between the left portion and the right portion, a rate of panning being proportional to a distance of the user input in the pan control region away from the central portion of the pan control region.

5. The touchpad of claim 1, wherein the pan control region is horizontally disposed adjacent the cursor control region.

6. The touchpad of claim 1, wherein the scroll control region has an upper portion and a lower portion, an upward scroll corresponding to a user input towards the upper portion of the scroll control region, and a downward scroll corresponding to a user input towards the lower portion of the scroll control region.

7. The touchpad of claim 6, wherein the scroll control region is pressure sensitive, a rate of scrolling being proportional to a variable amount of pressure applied to the scroll control region by the user input.

8. The touchpad of claim 6, wherein the scroll control region further has a central portion located between the upper portion and the lower portion, a rate of scrolling being proportional to a distance of the user input in the scroll control region away from the central portion of the scroll control region.

9. The touchpad of claim 1, wherein the scroll control region is vertically disposed adjacent the cursor control region.

10. The touchpad of claim 1, wherein the cursor control region, the pan control region, and the scroll control region are portions of a single touchpad member.

11. The touchpad of claim 10, wherein the cursor control region, the pan control region, and the scroll control region are separated by a visual cue on the touchpad member.

12. The touchpad of claim 10, wherein the visual cue is a printed stripe.

13. The touchpad of claim 10, wherein the cursor control region, the pan control region, and the scroll control region are separated by raised ridges on the touchpad member.

14. The touchpad of claim 10, further comprising a cover over the touchpad member, the cover having panes to form three openings to designate the cursor control region, the pan control region, and the scroll control region.

15. The touchpad of claim 1, wherein the cursor control region, the pan control region, and the scroll control region are each comprised of separate touchpad members.

16. The touchpad of claim 15, further comprising a cover over the touchpad members, the cover having panes to form three openings that designate the cursor control region, the pan control region, and the scroll control region.

17. The touchpad of claim 1, further comprising a function control region that is not within any display area of the display screen and is adjacent the cursor control region, the function control region generating and providing a function control signal to the computer based on a user input that falls within the function control region, the function control signal being linked to a function within the graphical user interface.

18. The touchpad of claim 17, wherein the function control region is vertically disposed adjacent the cursor control region.

19. The touchpad of claim 17, wherein the function control signal is linked to an application program containing the portion of the graphical user interface display that is caused to scroll by the scroll control signal.

20. The touchpad of claim 19, wherein the function control signal is linked to at least one command in a menu bar of the application program.

21. A touchpad user input device coupled to a computer for controlling functions of a graphical user interface operating on a display area on a computer monitor display screen associated with the computer, the touch-sensitive user input device comprising:

(a) a first control region that is not within any display area of the display screen, the first control region generating a first control signal in response to a force and a movement of the force applied by a user within the first control region, the first control signal linked to the control of a cursor in the graphical user interface to allow the user to control the cursor; and (b) a second control region that is not within any display area of the display screen and is disposed adjacent the first control region, the second control region generating a second control signal in response to a force and a movement of the force applied by a user within the second control region, the second control signal linked to a second function in the graphical user interface to allow the user to control the second function.

22. The touchpad user input device of claim 21, further comprising a third control region that is not within any display area of the display screen and is disposed adjacent the first control region, the third control region generating a third control signal in response to a force applied by a user within the third control region, the third control signal linked to a third function in the graphical user interface to allow the user to control the third function.

23. The touchpad user input device of claim 20, further comprising a plurality of control regions that is not within any display area of the display screen and is disposed adjacent the first control region, each of the plurality of control regions generating a control signal in response to a force applied by a user within each control region, the control signal linked to a function in the graphical user interface to allow the user to control the function.

24. The touchpad user input device of claim 22, wherein the first control region is coupled to the control of a cursor in the graphical user interface, the second control region is coupled to a pan function in the graphical user interface, and the third control region is coupled to a scroll function in the graphical user interface.

25. The touchpad user input device of claim 21, wherein the first control region is coupled to the control of a cursor in the graphical user interface.

26. The touchpad user input device of claim 21, wherein the second control region is coupled to a pan function in the graphical user interface.

27. The touchpad user input device of claim 21, wherein the second control region is coupled to scroll function in the graphical user interface.

28. A method of linking a touchpad to different functions within a graphic user interface operating on a display area of a computer monitor display screen associated with a computer, the method comprising:

(a) mapping a surface of the touchpad to define a cursor control area that is not within any display area of the display screen and a function area that is not within any display area of the display screen;

(b) receiving a signal indicative of an initial user contact location and a movement on the surface of the touchpad;

(c) comparing the initial user contact location with the defined cursor control area and moving a cursor within the graphic user interface in a manner that corresponds to the movement on the surface of the touchpad member if the initial user contact falls within the defined cursor control region; and (d) comparing the initial user contact location with the defined function area and performing a corresponding function within the graphic user interface that corresponds to the movement on the surface of the touchpad member if the initial user contact falls within the function area.

* * * * *

UNITED STATES PATENT AND TRADEMARK OFFICE
CERTIFICATE OF CORRECTION

PATENT NO. : 5,748,185
DATED : May 5, 1998
INVENTOR(S) : A.H. Stephan et al.

It is certified that error appears in the above-identified patent and that said Letters Patent is hereby corrected as shown below:

| COLUMN | LINE | |
|---|---|---|
| 13 (Claim 1, | 13 line 11) | after "of" insert --the-- |
| 14 (Claim 23, | 66 line 1) | "20" should read --22-- |
| 15 (Claim 27, | 20 line 2) | after "to" insert --a-- |

Signed and Sealed this

First Day of September, 1998

Attest:

BRUCE LEHMAN

*Attesting Officer*  *Commissioner of Patents and Trademarks*